United States Patent
Taki

(10) Patent No.: US 11,326,044 B2
(45) Date of Patent: May 10, 2022

(54) RESIN COMPOSITION, SHEATHED CABLE, AND WIRE HARNESS

(71) Applicant: Yazaki Corporation, Tokyo (JP)

(72) Inventor: Akihiro Taki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/724,843

(22) Filed: Dec. 23, 2019

(65) Prior Publication Data

US 2020/0207958 A1      Jul. 2, 2020

(30) Foreign Application Priority Data

Dec. 27, 2018   (JP) .............................. JP2018-244115

(51) Int. Cl.

| | |
|---|---|
| *H01B 3/28* | (2006.01) |
| *H01B 3/44* | (2006.01) |
| *H01B 9/02* | (2006.01) |
| *C08L 23/08* | (2006.01) |
| *C08K 3/016* | (2018.01) |
| *C08K 3/22* | (2006.01) |
| *C08K 5/00* | (2006.01) |
| *C08K 5/02* | (2006.01) |
| *C08K 5/5333* | (2006.01) |
| *C08L 23/16* | (2006.01) |
| *C08L 33/08* | (2006.01) |

(52) U.S. Cl.
CPC .............. *C08L 23/08* (2013.01); *C08K 3/016* (2018.01); *C08K 3/22* (2013.01); *C08K 5/0066* (2013.01); *C08K 5/02* (2013.01); *C08K 5/5333* (2013.01); *C08L 23/16* (2013.01); *C08L 33/08* (2013.01); *C08K 2003/2217* (2013.01); *C08K 2003/2227* (2013.01); *C08L 2203/202* (2013.01); *C08L 2205/02* (2013.01); *C08L 2312/00* (2013.01)

(58) Field of Classification Search
CPC ...... C08L 23/0869; C08L 33/08; C08L 33/10; C08L 23/16; C08K 3/016; C08K 5/066
See application file for complete search history.

(56) References Cited

U.S. PATENT DOCUMENTS

| | | | | |
|---|---|---|---|---|
| 5,374,778 | A | * | 12/1994 | Hashimoto ............ H01B 11/08 174/102 R |
| 2008/0053696 | A1 | | 3/2008 | Nakayama et al. |
| 2010/0022715 | A1 | * | 1/2010 | Grein ...................... C08L 23/04 525/221 |
| 2014/0367141 | A1 | | 12/2014 | Tozawa et al. |
| 2015/0104659 | A1 | * | 4/2015 | Kim ..................... C08K 5/3417 428/521 |
| 2016/0307669 | A1 | | 10/2016 | Tozawa et al. |
| 2018/0371221 | A1 | | 12/2018 | Yanagawa et al. |

FOREIGN PATENT DOCUMENTS

| | | | |
|---|---|---|---|
| EP | 3 053 956 A1 | | 8/2016 |
| JP | 60155250 A | * | 8/1985 |
| JP | 61-183335 A | | 8/1986 |
| JP | 2008-084833 A | | 4/2008 |
| JP | 2011-032368 A | | 2/2011 |
| JP | 2016-173991 A | | 9/2016 |
| WO | 2005/123828 A1 | | 12/2005 |
| WO | 2018/015798 A1 | | 1/2018 |
| WO | 2018/074233 A1 | | 4/2018 |

* cited by examiner

*Primary Examiner* — Irina S Zemel
*Assistant Examiner* — Jeffrey S Lenihan
(74) *Attorney, Agent, or Firm* — Sughrue Mion, PLLC

(57) ABSTRACT

The resin composition contains: a resin component containing an ethylene-(meth)acrylate ester copolymer and at least one of an ethylene-propylene-diene terpolymer or ethylene-acrylate rubber; and a flame retardant, and the resin component is crosslinked. The tensile stress at 19% strain of the resin composition is 2.0 MPa or less, and the resin composition has heat resistance at 150° C. prescribed in JASO D624.

7 Claims, 1 Drawing Sheet

RESIN COMPOSITION, SHEATHED CABLE, AND WIRE HARNESS

CROSS REFERENCE TO RELATED APPLICATION

This application is based upon and claims the benefit of priority from the prior Japanese Patent Application No. 2018-244115, filed on Dec. 27, 2018, the entire contents of which are incorporated herein by reference.

BACKGROUND

1. Technical Field

The present invention relates to a resin composition, a sheathed cable, and a wire harness.

2. Background Art

In order to increase the traveling distance of an electric vehicle, increasing a battery capacity has been considered. However, it is necessary to increase a conductor diameter of a cable which is a component of a wire harness so that the charging time does not become longer with the increase in the battery capacity. On the other hand, the volume of the battery tends to increase with the increase in the battery capacity, and hence a ratio of a battery pack to a vehicle body increases. Hence, it needs to design the cable so that the cable can be bent greatly and wired even in a narrow and short path.

In the narrow and short path, a silicone rubber cable, in which a conductor is insulated and sheathed by flexible silicone rubber, is often used. However, the silicone rubber is more expensive than conventionally used insulating materials such as polyvinyl chloride, polypropylene, and polyethylene. In addition, in a case where the silicone rubber cable is manufactured, after the conductor is sheathed with the silicone rubber by extrusion molding or the like, there is a need for a special device, such as a hot air device for vulcanization, as compared with a manufacturing method for the conventionally used insulating material. Furthermore, in view of the actual use environment, there are not so many sites where a high heat resistance level (200° C.×10, 000 hours) is required as in the silicone rubber cable. Several cables have been disclosed as cables other than the silicone rubber cable.

For example, JP 2008-84833 A describes a flexible non-halogen cable in which a conductor obtained by twisting a plurality of strands is sheathed with an insulator. Each of the strands has a diameter of 0.12 to 0.31 mm. The insulator is obtained such that a resin component material and a metal hydroxide are mixed to form a sheathing material, and the sheathing material is sheathed on the conductor and then crosslinked to form a crosslinked resin composition. Taking an ethylene-based copolymer as a main component, the ethylene-based copolymer containing 25 to 40% by weight of a vinyl monomer, which contains oxygen in the molecular structure, other than vinyl acetate, and taking an elastomer as a sub-component, the resin component material is formed by mixture of the main component and the sub-component.

Further, JP 2016-173991 A describes an electric cable in which an outer circumference of a conductor made up of several strands having a strand diameter of 0.15 mm or more and 0.5 mm or less is sheathed with an insulating resin containing a flame retardant. The insulating resin is made of a copolymer A of an olefin and a comonomer having a polarity, or a mixture of the copolymer A and a copolymer B of an olefin and an $\alpha$-olefin. The electric cable diameter/conductor diameter is 1.15 or more and 1.40 or less, the insulating resin is crosslinked, and its secant modulus is 10 MPa or more and 50 MPa or less.

SUMMARY

The flexibility of the flexible non-halogen cable described in JP 2008-84833 A and the flexibility of the electric cable described in JP 2016-173991 A cannot be said to be high enough as compared with silicone rubber.

The flexibility can be increased by reducing the diameter of the conductor in addition to reducing the thickness of the sheathing layer, but in practice, the reduction in the diameter of the conductor is not practical, considering the cost.

The present invention has been made in view of the problems of the prior art as thus described. An objective of the present invention is to provide a resin composition having sufficient flexibility and heat resistance as a sheathing layer of a cable, and a sheathed cable and a wire harness using the same.

A resin composition according to a first aspect of the present invention contains: a resin component that contains an ethylene-(meth)acrylate ester copolymer and at least one of an ethylene-propylene-diene terpolymer or ethylene-acrylate rubber; and a flame retardant, and the resin component is crosslinked. The tensile stress at 19% strain of the resin composition is 2.0 MPa or less, and the resin composition has heat resistance at 150° C. that is specified in the Japanese Automotive Standards Organization (JASO) D624.

A resin composition according to a second aspect of the present invention relates to the resin composition according to the first aspect, in which a content of at least one of the ethylene-propylene-diene terpolymer or the ethylene-acrylate rubber in the resin component is 20% by mass to 60% by mass. When the content of the resin component is set to 100 parts by mass, the content of the flame retardant is less than 50 parts by mass.

A resin composition according to a third aspect of the present invention relates to the resin composition of the first or second aspect, further contains an additive, in which the content of the additive is 25 parts by mass or less when the content of the resin component is set to 100 parts by mass.

A resin composition according to a fourth aspect of the present invention relates to the resin composition according to any of the first to third aspects, in which the ethylene-(meth)acrylate ester copolymer is an ethylene-methyl acrylate copolymer.

A sheathed cable according to a fifth aspect of the present invention includes: a conductor; and a sheathing layer sheathing the conductor and formed of the resin composition according to any one of first to fourth aspects.

A wire harness according to a sixth aspect of the present invention includes the sheathed cable according to the fifth aspect.

According to the present invention, it is possible to provide a resin composition having sufficient flexibility and heat resistance as a sheathing layer of a cable, and a sheathed cable and a wire harness using the same.

BRIEF DESCRIPTION OF THE DRAWINGS

The FIGURE is a cross-sectional view illustrating an example of a sheathed cable according to the present embodiment.

DETAILED DESCRIPTION

Figure 1:
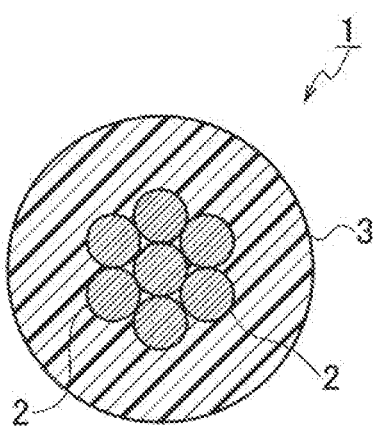

Hereinafter, a resin composition, a sheathed cable, and a wire harness according to the present embodiment will be described in detail with reference to a drawing. Note that the dimensional ratio in the drawing is exaggerated for the sake of description and may differ from the actual ratio.

[Resin Composition]

The resin composition according to the present embodiment contains a resin component and a flame retardant. When the content of the resin component is set to 100 parts by mass, the content of the flame retardant is preferably less than 50 parts by mass. By setting the content of the flame retardant to less than 50 parts by mass, the flexibility of the resin composition can be improved. Note that the content of the flame retardant is preferably 45 parts by mass or less when the content of the resin component is set to 100 parts by mass. In addition, from the viewpoint of the flame retardancy, the content of the flame retardant is preferably 20 parts by mass or more, more preferably 25 parts by mass or more, and still more preferably 30 parts by mass or more when the content of the resin component is set to 100 parts by mass.

(Resin Component)

The resin component contains an ethylene-(meth)acrylate ester copolymer and at least one of an ethylene-propylene-diene terpolymer (EPDM) or ethylene-acrylate rubber (AEM). In the present specification, the (meth)acrylate ester means at least one of acrylate ester or methacrylate ester.

The ethylene-(meth)acrylate ester copolymer is a copolymer obtained by polymerizing a monomer component that contains ethylene and (meth)acrylate ester. The ethylene-(meth)acrylate ester copolymer can be formed the monomer component containing ethylene and (meth)acrylate ester by a known polymerization reaction.

The (meth)acrylate ester contains at least one (meth) acrylate selected from the group consisting of methyl (meth)acrylate, ethyl (meth)acrylate, butyl (meth)acrylate, and 2-ethylhexyl (meth)acrylate, for example.

Specific examples of the ethylene-(meth)acrylate ester copolymer are not particularly limited but include, for example, an ethylene-methyl methacrylate copolymer (EMMA), an ethylene-methyl acrylate copolymer (EMA), an ethylene-ethyl acrylate copolymer (EEA), and an ethylene-butyl acrylate copolymer (EBA). These ethylene-(meth) acrylate ester copolymers may be used alone or in combination of two or more. The ethylene-(meth)acrylate ester copolymer may or may not be modified with maleic acid, maleic anhydride, and the like. From the viewpoint of heat resistance, the ethylene-(meth)acrylate ester copolymer is preferably at least one selected from the group consisting of the ethylene-methyl acrylate copolymer (EMA), the ethylene-ethyl acrylate copolymer (EEA), and the ethylene-butyl acrylate copolymer (EBA). Further, from the viewpoint of heat resistance, the ethylene-(meth)acrylate ester copolymer is preferably at least one of the ethylene-methyl acrylate copolymer (EMA) or the ethylene-ethyl acrylate copolymer (EEA). Moreover, from the viewpoint of heat resistance, the ethylene-(meth)acrylate ester copolymer is still more preferably the ethylene-methyl acrylate copolymer (EMA).

The ethylene-(meth)acrylate ester copolymer may contain a small amount of a monomer component other than ethylene and (meth)acrylate ester. The total content of ethylene and (meth)acrylate ester contained in the ethylene-(meth) acrylate ester copolymer is preferably 80% by mass or more, and more preferably 90% by mass or more. Further, the total content of ethylene and (meth)acrylate ester contained in the ethylene-(meth)acrylate ester copolymer is more preferably 95% by mass or more.

The content of (meth)acrylate ester contained in the ethylene-(meth)acrylate ester copolymer is not particularly limited but is preferably 15% by mass or more, more preferably 20% by mass or more, and still more preferably 25% by mass or more. By setting the lower limit of the content of (meth)acrylate ester to the above value, the additive amount of at least one of the ethylene-propylene-diene terpolymer or the ethylene-acrylate rubber is reduced, and the formability of the sheathed cable to be described later can be improved.

The content of ethylene contained in the ethylene-(meth) acrylate ester copolymer is not particularly limited but is preferably 55% by mass or more and 75% by mass or less, and more preferably 65% by mass or more and 72% by mass or less. By setting the content of ethylene contained in the ethylene-(meth)acrylate ester copolymer to the above range, the mechanical properties of the sheathed cable to be described later can be improved.

Ethylene-propylene-diene terpolymer (EPDM) is a rubbery copolymer of ethylene, propylene, and diene. The physical properties of the ethylene-propylene-diene terpolymer are mainly controlled by the amount of ethylene and the amount of diene. The smaller the amount of ethylene, the lower the hardness (softer), and the larger the amount of diene, the smaller the compression set. However, the content of ethylene contained in the ethylene-propylene-diene terpolymer (EPDM) is not particularly limited but is preferably 70% by mass or less from the viewpoint of improving the flexibility. In addition, the content of diene contained in the ethylene-propylene-diene terpolymer (EPDM) is preferably 7% by mass or less from the viewpoint of improving the heat resistance. Note that the diene content of 7% by mass or less as described above is also referred to as a middle diene content.

The ethylene-propylene-diene terpolymer (EPDM) may contain oil such as a mineral oil, a paraffin oil, or a naphthenic oil. The Mooney viscosity of the ethylene-propylene-diene terpolymer (EPDM) is preferably 60 ML (1+4) 125° C. or less. Among the descriptions of 60 ML (1+4) 125° C., 60 M represents the Mooney viscosity, L represents that the shape of a rotor is L-shaped, (1+4) represents one minute for preheating time and four minutes for rotation time of the rotor, and 125° C. represents a test temperature of 125° C. In addition, the Mooney viscosity can be measured in accordance with Japanese Industrial Standard (JIS) K6300-1: 2013 (Rubber, unvulcanized—Physical property—Part 1: Determination of Mooney viscosity and Pre-vulcanization characteristics with Mooney viscometer).

Further, the ethylene-acrylate rubber (AEM) is also a rubbery copolymer of ethyl acrylate or other acrylate esters with ethylene. The Shore A hardness of at least one of the ethylene-propylene-diene terpolymer or the ethylene-acrylate rubber is not particularly limited but is preferably 70 or less from the viewpoint of flexibility.

In the present embodiment, the resin component is crosslinked. The heat resistance of the resin composition can be improved by crosslinking the ethylene-(meth)acrylate ester copolymer with at least one of the ethylene-propylene-diene terpolymer or the ethylene-acrylate rubber. Although the method for crosslinking the resin component is not particularly limited, for example, the resin component may be crosslinked by irradiation with radiation, or the resin component may be crosslinked using a crosslinking agent contained in the resin composition. Note that the resin component is preferably radiation-crosslinked.

The radiation used for the crosslink may be, for example, γ-rays or electron beams. By irradiating the sheathing layer with radiation, radicals are generated in molecules to form crosslinks between the molecules.

An organic peroxide or the like can be used for the crosslinking agent, for example. The crosslinking agent may be at least one selected from the group consisting of dicumyl peroxide, di-tert-butyl peroxide, 2,5-dimethyl-2,5-di-(tert-butylperoxy) hexane, 2,5-dimethyl-2,5-di-(tert-butylperoxy) hexyne-3, 1,3-bis(tert-butylperoxyisopropyl) benzene, 1,1-bis(tert-butylperoxy)-3,3,5-trimethylcyclohexane, n-butyl-4,4-bis(tert-butylperoxy) valerate, benzoyl peroxide, 2,4-dichlorobenzoyl peroxide, tert-butyl peroxybenzoate, tert-butyl peroxyisopropyl carbonate, diacetyl peroxide, lauroyl peroxide, and tert-butylcumyl peroxide. The crosslinking agent may be used alone or in combination of two or more. In the resin composition, the content of the crosslinking agent is preferably 0.05 to 0.10 parts by mass relative to 100 parts by mass of the resin component.

The resin composition may contain a crosslinking aid in addition to the crosslinking agent so as to improve the crosslinking efficiency. A polyfunctional compound can be used as a crosslinking aid. The crosslinking aid may be at least one compound selected from the group consisting of an acrylate compound, a methacrylate compound, an allyl compound, and a vinyl compound, for example.

The acrylate compound is a polyfunctional compound having an acrylic group at the end. Examples of the acrylate compound include 1,1-methanediol diacrylate, 1,2-ethanediol diacrylate, 1,3-propanediol diacrylate, 1,4-butanediol diacrylate, 1,6-hexanediol diacrylate, 1,9-nonanediol diacrylate, 1,10-decanediol diacrylate, vinyl acrylate, allyl acrylate, glyceryl triacrylate, and trimethylolpropane triacrylate.

The methacrylate compound is a polyfunctional compound having a methacryl group at the end. Examples of the methacrylate compound include 1,1-methanediol dimethacrylate, 1,2-ethanediol dimethacrylate, 1,3-propanediol dimethacrylate, 1,4-butanediol dimethacrylate, 1,6-hexanediol dimethacrylate, 1,9-nonanediol dimethacrylate, 1,10-decanediol dimethacrylate, vinyl methacrylate, allyl methacrylate, glyceryl trimethacrylate, and trimethylolpropane trimethacrylate.

The allyl compound is a polyfunctional compound having an allyl group at the end. Examples of the allyl compound include diallyl maleate, diallyl itaconate, diallyl malonate, diallyl phthalate, diallyl benzene phosphonate, triallyl phosphate, and triallyl cyanurate.

The vinyl compound is a polyfunctional compound having a vinyl group at the end. Examples of the vinyl compound include divinylbenzene and ethylene glycol divinyl ether.

These polyfunctional compounds may be used alone or in combination of two or more. Among these compounds, it is preferable to use trimethylolpropane trimethacrylate because of high affinity to the resin component.

In addition, the content of the crosslinking aid in the resin composition is preferably 0.1 parts by mass to 5 parts by mass, and more preferably 0.8 parts by mass to 2 parts by mass, relative to 100 parts by mass of the resin component. By setting the content in such a range, the heat resistance of the resin composition can be improved more.

The content of at least one of the ethylene-propylene-diene terpolymer or the ethylene-acrylate rubber in the resin component is not particularly limited. However, the content of the ethylene-acrylate rubber in the resin component is preferably less than 70% by mass from the viewpoint of being excellent in the appearance when made into a cable. Furthermore, the content of at least one of the ethylene-propylene-diene terpolymer or the ethylene-acrylate rubber in the resin component is more preferably 20% by mass to 60% by mass. By setting the content to 20% by mass or more, the flexibility of the resin composition can be improved. Moreover, by setting the content to 60% by mass or less, the heat resistance can be improved. From the viewpoint of the flexibility, the content of at least one of the ethylene-propylene-diene terpolymer or the ethylene-acrylate rubber in the resin component is still more preferably 25% by mass or more. In addition, the content of at least one of the ethylene-propylene-diene terpolymer or the ethylene-acrylate rubber in the resin component is preferably 50% by mass or less. With the above settings, at the time of producing a sheathed cable by extrusion molding of the resin composition, deformation can be prevented.

(Flame Retardant)

The type of the flame retardant is not particularly limited so long as being able to impart flame retardancy to the resin composition. The flame retardant may contain, for example, at least one of an organic flame retardant or an inorganic flame retardant. The organic flame retardant may contain at least one or more flame retardants selected from the group consisting of a halogen flame retardant, a phosphorus flame retardant, and a nitrogen flame retardant, for example. The inorganic flame retardant may contain, for example, at least one of a metal hydroxide or an antimony flame retardant. The metal hydroxide may contain, for example, at least one of magnesium hydroxide or aluminum hydroxide. The antimony flame retardant may contain, for example, antimony trioxide.

The halogen flame retardant can capture hydroxyl radicals that promote the combustion of a thermoplastic resin and can reduce the combustion of the resin composition. The halogen flame retardant may be, for example, a compound in which an organic compound has been substituted with at least one or more halogens. The halogen flame retardant may contain at least one or more flame retardant selected from the group consisting of a fluorine flame retardant, a chlorine flame retardant, a bromine flame retardant, and an iodine flame retardant, for example. The halogen flame retardant is preferably a bromine flame retardant or a chlorine flame retardant, and more preferably a bromine flame retardant.

The chlorine flame retardant may contain at least one flame retardant selected from the group consisting of chlorinated polyethylene, chlorinated paraffin, and perchloro cyclopentadecane, for example.

The bromine flame retardant may contain at least one flame retardant selected from the group consisting of, for example, 1,2-bis(bromophenyl) ethane, 1,2-bis(pentabromophenyl) ethane, hexabromobenzene, ethylene bis-dibromonorbornane dicarboximide, ethylene bis-tetrabromo phthalimide, tetrabromobisphenol S, tris(2,3-dibromopropyl-1) isocyanurate, hexabromocyclododecane (HBCD), octabromophenyl ether, tetrabromobisphenol A (TBA), TBA epoxy oligomer or polymer, TBA-bis(2,3-dibromopropyl ether), decabromodiphenyl oxide, polydibromophenylene oxide, bis(tribromophenoxy) ethane, ethylene bis(pentabromophenyl), dibromoethyl-dibromocyclohexane, dibromoneopentyl glycol, tribromo phenol tribromophenol allyl ether, tetradecabromodiphenoxybenzene, 2,2-bis(4-hydroxy-3,5-dibromophenyl) propane, 2,2-bis(4-hydroxyethoxy-3,5-dibromophenyl) propane, pentabromophenol, pentabromotoluene, pentabromodiphenyl oxide, hexabromodiphenyl ether, octabromodiphenyl ether, decabromodiphenyl ether, octabromodiphenyl oxide, dibromoneopentyl glycol tetracarbonate, bis(tribromophenyl) fumaramide, and N-methyl hexabromophenylamine.

The phosphorus flame retardant may contain at least one or more flame retardants selected from the group consisting of phosphate ester, condensed phosphate ester, a cyclic phosphorus compound, and red phosphorus, for example.

The nitrogen flame retardant may contain, for example, at least one of a guanylurea flame retardant such as guanyl urea phosphate or a melamine-based compound such as melamine cyanurate.

The flame retardant preferably contains the bromine flame retardant and the antimony flame retardant, and more preferably contains ethylene bis(pentabromophenyl) and antimony trioxide. In the resin composition according to the present embodiment, the flame retardancy can be improved by using the flame retardant as described above, even with a small content.

The content of the bromine flame retardant relative to the entire flame retardant is preferably 50% by mass to 80% by mass, and more preferably 60% by mass to 70% by mass. The content of the antimony flame retardant relative to the entire flame retardant is preferably 20% by mass to 50% by mass, and more preferably 30% by mass to 40% by mass. Furthermore, the ratio of the bromine flame retardant to the antimony flame retardant (bromine flame retardant/antimony flame retardant) is preferably 1 to 4, and more preferably 3/2 to 7/3.

In the resin composition of the present embodiment, when the additive is further contained and the content of the resin component is set to 100 parts by mass, the content of the additive is preferably 25 parts by mass or less. By setting the content of the additive to 25 parts by mass or less, the flexibility of the resin composition can be improved.

In the resin composition of the present embodiment, when the content of the resin component is set to 100 parts by mass, the content of the flame retardant and the additive other than the flame retardant is preferably less than 70 parts by mass. By setting the content of the flame retardant and the additive other than the flame retardant to less than 70 parts by mass, the flexibility of the resin composition can be improved. In the resin composition of the present embodiment, when the content of the resin component is set to 100 parts by mass, the content of the flame retardant and the additive other than the flame retardant is more preferably less than 60 parts by mass.

Examples of the additive may include the above-described crosslinking agent, the above-described crosslinking aid, an antioxidant, processing aid, a plasticizer, a metal deactivator, a filler, a reinforcing agent, a UV absorber, a stabilizer, a pigment, a dye, a coloring agent, an antistatic agent, a foaming agent and the like.

Examples of the antioxidant include a phenol-based antioxidant, a phosphorus-based antioxidant, and a sulfur-based antioxidant.

Examples of the processing aid include petroleum oils such as a paraffinic oil and a naphthenic oil to be added to a rubber material and the like.

In the resin composition of the present embodiment, the tensile stress at 19% strain is 2.0 MPa or less. By setting the tensile stress at 19% strain of the resin composition to 2.0 MPa or less, the flexibility of the resin composition can be improved. Furthermore, in order to make the flexibility close to silicone rubber, the tensile stress at 19% strain is more preferably 1.5 MPa or less. Note that the tensile stress at 19% strain can be measured in accordance with Japanese Industrial Standard JIS K7161-1 (Plastics—Determination of tensile properties—Part 1: General principles).

Moreover, the resin composition of the present embodiment has heat resistance at 150° C. that is prescribed in the Japanese Automotive Standards Organization (JASO) D624. By having the heat resistance as described above, the resin composition can be used as a sheathing layer of a cable or the like even in a high-temperature environment such as an automobile.

Although the resin composition is produced by melting and kneading the above-described resin component and flame retardant, and the like, for its method, a known means can be used. For example, after pre-blending is performed in advance using a high-speed mixing device such as a Henschel mixer, kneading is performed using a known kneader such as a Banbury mixer, a kneader, or a roll mill, so that a resin composition can be obtained.

The resin composition of the present embodiment contains: the resin component containing the ethylene-(meth)acrylate ester copolymer and at least one of the ethylene-propylene-diene terpolymer or the ethylene-acrylate rubber; and the flame retardant, and the resin component is crosslinked. The tensile stress at 19% strain of the resin composition is 2.0 MPa or less, and the resin composition has heat resistance at 150° C. that is prescribed in the Japanese Automotive Standards Organization (JASO) D624. Therefore, the content of the flame retardant can be set to less than 50 parts by mass, and the flexibility and the heat resistance of the resin composition can both be achieved. Such a resin composition is suitable for use as a sheathing layer of a sheathed cable.

[Sheathed Cable]

The FIGURE is a cross-sectional view illustrating an example of a sheathed cable 1 according to the present embodiment. As illustrated in the FIGURE, the sheathed cable 1 of the present embodiment contains a conductor 2, and a sheathing layer 3 that sheathes the conductor 2 and is formed of the resin composition according to the above embodiment. The resin composition according to the above embodiment is excellent in flexibility and heat resistance. Therefore, the sheathed cable 1 contains the sheathing layer 3 formed of such a resin composition can be preferably used, for example, as the sheathed cable 1 for an automobile.

The conductor 2 may be formed of only one strand or may be a collective strand wire formed by bundling a plurality of strands. Moreover, the conductor 2 may be formed of only one strand wire or may be a composite strand wire formed by bundling a plurality of collective strand wires. The configuration and size of the conductor 2 are preferably the configuration and size defined in at least one of JASO D624 or ISO 6722-1.

The diameter of the conductor 2 is not particularly limited but is preferably 4.0 mm or more, and more preferably 5.0 mm or more. Setting the diameter of the conductor 2 as described above enables the reduction in resistance of the conductor and shortens the charging time even for a large capacity battery, for example. The diameter of the conductor 2 is not particularly limited but is preferably 25 mm or less, and more preferably 20 mm or less. Setting the diameter of the conductor 2 as described above can facilitate the wiring of the sheathed cable 1 even in a narrow and short path.

The diameter of the strand is not particularly limited but is preferably 0.1 mm or more, and more preferably 0.2 mm or more. Setting the diameter of the strand as described above can prevent the cutting of the strand. The diameter of the strand is not particularly limited but is preferably 0.5 mm or less, and more preferably 0.4 mm or less. Setting the diameter of the strands as described above can facilitate the wiring of the sheathed cable 1 even in a narrow and short path.

The material constituting the conductor 2 is not particularly limited but is preferably at least one conductive metal material selected from the group consisting of copper, a copper alloy, aluminum, and an aluminum alloy.

The thickness of the sheathing layer 3 is not particularly limited but is preferably 0.5 mm or more, and more preferably 0.65 mm or more. Setting the thickness of sheathing layer 3 as described above enables effective protection of the conductor 2. The thickness of the sheathing layer 3 is not particularly limited but is preferably 2.0 mm or less, and more preferably 1.85 mm or less. Setting the thickness of the sheathing layer 3 as described above can facilitate the wiring of the sheathed cable 1 even in a narrow and short path.

The sheathed cable 1 may further include a shield layer that sheathes the sheathing layer 3 and a sheath layer that further sheathes the shield layer. The shield layer can prevent the emission of unnecessary electromagnetic waves from the conductor 2. The shield layer can be formed by knitting a conductive metal foil, a foil containing metal, or a metal wire (metal conductor) in a mesh shape. The sheath layer can effectively protect and bundle the shield layer. The sheath layer is not particularly limited, but an olefin resin such as polyethylene may be used, and the resin composition according to the above embodiment may be used.

The conductor 2 may be sheathed with the sheathing layer 3 by a known method. For example, the sheathing layer 3 can be formed by general extrusion molding. As an extruder used in extrusion molding, for example, a single screw extruder or a twin-screw extruder can be used, and one having a screw, a breaker plate, a crosshead, a distributor, a nipple, and a die can be used.

In a case where the resin composition constituting the sheathing layer 3 is produced, the resin composition is thrown into the extruder set to a temperature at which the resin melts sufficiently. At this time, a flame retardant and, if necessary, other components such as an antioxidant and a processing aid are also thrown into the extruder. Then, the resin composition is melted and kneaded by a screw, and a certain amount of the resin composition is supplied to the crosshead via the breaker plate. The melted resin composition is allowed to flow into the circumference of the nipple by the distributor and is extruded in the state of being sheathed on the outer circumference of the conductor 2 by the die to obtain the sheathing layer 3 sheathing the outer circumference of the conductor 2.

As described above, in the sheathed cable 1 of the present embodiment, the sheathing layer 3 can be molded by extrusion in the same manner as a general resin composition for a cable. In order to improve the strength of the sheathing layer 3, after the formation of the sheathing layer 3 on the outer circumference of the conductor 2, the resin composition may be crosslinked by a method such as irradiation with the radiation described above.

[Wire Harness]

The wire harness according to the present embodiment includes the sheathed cable 1. The resin composition according to the above embodiment is excellent in flexibility and heat resistance. Therefore, the sheathed cable 1 provided with the sheathing layer 3 formed of the resin composition as thus described can be preferably used as a wire harness for an automobile, for example.

Examples

Hereinafter, the present embodiment will be described in more detail by examples and comparative examples, but the present embodiment is not limited to these examples.

A pure copper conductor (strand wire) having a cross-sectional area of 3.0 mm$^2$ was prepared as a metal conductor. Then, the conductor was molded by extrusion at a temperature condition of about 140° C. to 180° C. by using an extrusion sheathing apparatus for manufacturing a cable having a screw diameter of 40 mm, and a sheathed cable sheathed by a resin composition of each example illustrated in a table (unit: parts by mass) was produced. During the extrusion molding, an adjustment was made so that the thickness of the sheathing layer after the sheathing was 0.65 mm as a standard. In addition, the sheathed cable was crosslinked at a condition of 750 kV to 950 kV×140 to 200 kGy. A conductor was extracted from the obtained sheathed cable, and the flexibility and the heat resistance of the resin composition constituting the sheathing layer were evaluated.

(Resin Component)
(1) Ethylene-Ethyl Acrylate Copolymer (EEA)
Ethyl acrylate (EA) content: 15% by mass
DPDJ-6182 (manufactured by NUC CO., LTD.)
(2) Ethylene-Ethyl Acrylate Copolymer (EEA)
Ethyl acrylate (EA) content: 20% by mass
DPDJ-9169 (manufactured by NUC CO., LTD.)
(3) Ethylene-Ethyl Acrylate Copolymer (EEA)
Ethyl acrylate (EA) content: 25% by mass
NUC-6570 (manufactured by NUC CO., LTD.)
(4) Ethylene-Ethyl Acrylate Copolymer (EEA)
Ethyl acrylate (EA) content: 30% by mass
EX 4227 (manufactured by Ube-Maruzen Polyethylene Co., Ltd.)
(5) Ethylene-Methyl Acrylate Copolymer (EMA)
Methyl acrylate (MA) content: 20% by mass
Elvaloy (registered trademark) AC1820 (manufactured by Du Pont-Mitsui Polychemicals Co., Ltd.)
(6) Ethylene-Methyl Acrylate Copolymer (EMA)
Methyl acrylate (MA) content: 25% by mass
Elvaloy (registered trademark) AC 1125 (manufactured by Du Pont-Mitsui Polychemicals Co., Ltd.)
(7) Ethylene-Methyl Acrylate Copolymer (EMA)
Methyl acrylate (MA) content: 29% by mass
LOTRYL (registered trademark) 29MA03 (manufactured by Arkema K.K.)
(8) Ethylene-Vinyl Acetate Copolymer (EVA)
Vinyl acetate (VA) content: 15% by mass
Novatec LV440 (manufactured by Japan Polyethylene Corporation)
(9) Ethylene-Vinyl Acetate Copolymer (EVA)
Vinyl acetate (VA) content: 42% by mass
Evatane 42-60 (manufactured by Arkema K.K.)
(10) Ethylene-Propylene-Diene Terpolymer (EPDM)
NORDEL (registered trademark) IP 4760P (manufactured by The Dow Chemical Company)
(11) Ethylene-Acrylate Rubber (AEM)
Vamac (registered trademark) VMX 2122 (manufactured by Du Pont de Nemours, Inc.)

(Flame Retardant)
(1) Bromine Flame Retardant
Ethylene bis(pentabromophenyl)
SAYTEX (registered trademark) 8010 (manufactured by Albemarle Corporation)
(2) Antimony Flame Retardant
Antimony trioxide
PATOX (registered trademark) M (manufactured by NIHON SEIKO CO., LTD.)

Note that an adjustment was made so that the content of the bromine flame retardant was 66.7% by mass and the content of the antimony flame retardant was 33.3% by mass relative to the whole flame retardant. That is, an adjustment was made so that the ratio of the bromine flame retardant relative to the antimony flame retardant (bromine flame retardant/antimony flame retardant) was 2.

(Antioxidant)

(1) ADK-STAB (registered trademark) AO-20 (manufactured by ADEKA CORPORATION)

(2) ADK-STAB (registered trademark) AO-412S (manufactured by ADEKA CORPORATION)

(Processing Aid)

TMPT (trimethylolpropane trimethacrylate), (manufactured by SHIN-NAKAMURA CHEMICAL CO., LTD.)

[Evaluation]

(Flexibility)

The resin composition after the crosslinking treatment described above was evaluated for the flexibility by measuring a tensile stress at 19% strain in accordance with JIS K7161. A test sample was prepared by molding the resin composition into a 1-mm-thick resin sheet and punching out a dumbbell No. 3 specified in JIS K6251: 2010 (vulcanized rubber and thermoplastic rubber—How to determine tensile properties). The tensile stress was measured at a test speed of 200 ram/min at a room temperature (23° C.). A case where the tensile stress at 19% strain was 2.0 MPa or less was evaluated as "○", and a case where the tensile stress at 19% strain exceeded 2.0 MPa was evaluated as "x".

(Heat Resistance)

The heat resistance of the resin composition after the crosslinking treatment described above was evaluated in accordance with of JASO D624. Specifically, the elongation of the test sample heated for a predetermined time was introduced into the Arrhenius equation, and a temperature at which the elongation of the test sample became 100% when heated for 10000 hours was estimated. The test sample was prepared by molding the resin composition into a 1-mm-thick resin sheet and punching out a dumbbell No. 3 specified in JIS K6251: 2010. The test sample used for the measurement was heated at a heating condition of 160° C. to 190° C. for 5,000 hours at most in accordance with JIS K 7212: 1999 (Plastic—Determination of thermal stability of thermoplastics—Oven method). Then, the test sample was taken out of an oven and left at room temperature (about 23° C.) for 12 hours. The elongation was measured at a test speed of 200 mm/min at a room temperature (23° C.). A case where the temperature at which the elongation of the test sample reaches 100% became 150° C. or higher was evaluated as "○", and a case where the elongation became less than 150° C. was evaluated as "x".

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| EEA(EA content 15%) | — | — | — | — | — | — | — | — | — | — |
| EEA(EA content 20%) | — | — | — | — | — | — | — | — | — | — |
| EEA(EA content 25%) | — | — | — | — | — | — | — | 50 | — | — |
| EEA(EA content 30%) | — | — | — | — | 80 | 55 | 50 | — | — | — |
| EMA(MA content 20%) | — | — | — | — | — | — | — | — | — | — |
| EMA(MA content 25%) | — | — | — | 50 | — | — | — | — | — | — |
| EMA(MA content 29%) | 80 | 55 | 50 | — | — | — | — | — | 80 | 55 |
| EVA(VA content 15%) | — | — | — | — | — | — | — | — | — | — |
| EVA(VA content 42%) | — | — | — | — | — | — | — | — | — | — |
| EPDM | 20 | 45 | 50 | 50 | 20 | 45 | 50 | 50 | — | — |
| AEM | — | — | — | — | — | — | — | — | 20 | 45 |
| Flame retardant | 40 | 40 | 40 | 40 | 40 | 40 | 40 | 40 | 40 | 40 |
| Antioxidant | 24 | 24 | 24 | 24 | 24 | 24 | 24 | 24 | 24 | 24 |
| Processing aid | 1 | 1 | 1 | 1 | 1 | 1 | 1 | 1 | 1 | 1 |
| Total | 165 | 165 | 165 | 165 | 165 | 165 | 165 | 165 | 165 | 165 |
| Flexibility | ○ | ○ | ○ | ○ | ○ | ○ | ○ | ○ | ○ | ○ |
| Heat resistance | ○ | ○ | ○ | ○ | ○ | ○ | ○ | ○ | ○ | ○ |

TABLE 2

|  | Example 11 | Example 12 | Example 13 | Example 14 | Example 15 | Example 16 | Example 17 | Example 18 | Example 19 |
|---|---|---|---|---|---|---|---|---|---|
| EEA(EA content 15%) | — | — | — | — | — | — | — | — | — |
| EEA(EA content 20%) | — | — | — | — | — | — | — | — | — |
| EEA(EA content 25%) | — | — | — | — | — | — | — | 40 | — |
| EEA(EA content 30%) | — | — | 80 | 55 | 50 | 40 | 30 | — | — |
| EMA(MA content 20%) | — | — | — | — | — | — | — | — | — |
| EMA(MA content 25%) | — | — | — | — | — | — | — | — | 40 |
| EMA(MA content 29%) | 50 | 40 | — | — | — | — | — | — | — |
| EVA(VA content 15%) | — | — | — | — | — | — | — | — | — |
| EVA(VA content 42%) | — | — | — | — | — | — | — | — | — |
| EPDM | — | — | — | — | — | — | — | — | — |
| AEM | 50 | 60 | 20 | 45 | 50 | 60 | 70 | 60 | 60 |
| Flame retardant | 40 | 40 | 40 | 40 | 40 | 40 | 40 | 40 | 40 |
| Antioxidant | 24 | 24 | 24 | 24 | 24 | 24 | 24 | 24 | 24 |
| Processing aid | 1 | 1 | 1 | 1 | 1 | 1 | 1 | 1 | 1 |
| Total | 165 | 165 | 165 | 165 | 165 | 165 | 165 | 165 | 165 |
| Flexibility | ○ | ○ | ○ | ○ | ○ | ○ | ○ | ○ | ○ |
| Heat resistance | ○ | ○ | ○ | ○ | ○ | ○ | ○ | ○ | ○ |

TABLE 3

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| EEA(EA content 15%) | 100 | — | — | — | — | — | — |
| EEA(EA content 20%) | — | 100 | — | — | — | — | — |
| EEA(EA content 25%) | — | — | 100 | — | — | — | — |
| EEA(EA content 30%) | — | — | — | 100 | — | — | — |
| EMA(MA content 20%) | — | — | — | — | — | — | — |
| EMA(MA content 25%) | — | — | — | — | — | — | — |
| EMA(MA content 29%) | — | — | — | — | 100 | — | — |
| EVA(VA content 15%) | — | — | — | — | — | 100 | — |
| EVA(VA content 42%) | — | — | — | — | — | — | 100 |
| EPDM | — | — | — | — | — | — | — |
| AEM | — | — | — | — | — | — | — |
| Flame retardant | 40 | 40 | 40 | 40 | 40 | 40 | 40 |
| Antioxidant | 24 | 24 | 24 | 24 | 24 | 24 | 24 |
| Processing aid | 1 | 1 | 1 | 1 | 1 | 1 | 1 |
| Total | 165 | 165 | 165 | 165 | 165 | 165 | 165 |
| Flexibility | X | X | X | X | X | X | ○ |
| Heat resistance | ○ | ○ | ○ | ○ | ○ | X | X |

TABLE 4

|  | Comparative Example 8 | Comparative Example 9 | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|---|
| EEA(EA content 15%) | — | — | — | — | — | — | — | — | — | — |
| EEA(EA content 20%) | — | — | — | — | — | — | — | — | — | — |
| EEA(EA content 25%) | — | — | — | — | — | — | 30 | — | — | — |
| EEA(EA content 30%) | — | — | — | — | — | 30 | — | — | 85 | — |
| EMA(MA content 20%) | — | — | — | 30 | — | — | — | — | — | — |
| EMA(MA content 25%) | — | — | — | — | 30 | — | — | — | — | — |
| EMA(MA content 29%) | 90 | 85 | 30 | — | — | — | — | 55 | — | 55 |
| EVA(VA content 15%) | — | — | — | — | — | — | — | — | — | — |
| EVA(VA content 42%) | — | — | — | — | — | — | — | — | — | — |
| EPDM | 10 | 15 | 70 | 70 | 70 | 70 | 70 | 45 | — | — |
| AEM | — | — | — | — | — | — | — | — | 15 | 45 |
| Flame retardant | 40 | 40 | 40 | 40 | 40 | 40 | 40 | 80 | 40 | 80 |
| Antioxidant | 24 | 24 | 24 | 24 | 24 | 24 | 24 | 24 | 24 | 24 |
| Processing aid | 1 | 1 | 1 | 1 | 1 | 1 | 1 | 1 | 1 | 1 |
| Total | 165 | 165 | 165 | 165 | 165 | 165 | 165 | 205 | 165 | 205 |
| Flexibility | X | X | ○ | ○ | ○ | ○ | ○ | X | X | X |
| Heat resistance | ○ | ○ | X | X | X | X | X | ○ | ○ | ○ |

As illustrated in Tables 1 to 4, in Examples 1 to 19, resin compositions having favorable flexibility and heat resistance were obtained. In particular, in Examples 1 to 16, 18, and 19, the appearance of the sheathed cable was particularly excellent. On the other hand, in Comparative Examples 1 to 7, since the ethylene-(meth)acrylate ester copolymer was used alone as the resin component, sufficient flexibility or heat resistance was not obtained. In Comparative Examples 8 and 9, since the content of EPDM in the resin component was small, sufficient flexibility was not obtained. In Comparative Examples 10 to 14, since the content of EPDM in the resin component was large, sufficient heat resistance was not obtained. In Comparative Examples 15 and 17, since the content of the flame retardant in the resin composition was large, sufficient flexibility was not obtained. In Comparative Example 16, since the content of AEM in the resin component was small, sufficient flexibility was not obtained.

As described above, although the present embodiment was described by the examples, the present embodiment is not limited to these, but various modifications are possible within the range of the gist of the present embodiment.

The invention claimed is:

1. A resin composition comprising:
a resin component that contains an ethylene-(meth)acrylate ester copolymer and at least one of an ethylene-propylene-diene terpolymer or ethylene-acrylate rubber; and
a flame retardant, wherein
the resin component is crosslinked,
a tensile stress at 19% strain is 2.0 MPa or less,
the resin composition has heat resistance at 150° C. that is prescribed in JASO D624,
the ethylene-(meth)acrylate ester copolymer is an ethylene-methyl acrylate copolymer,
a content of ethylene in the ethylene-methyl acrylate copolymer is 71% by mass or more and 75% by mass or less,
a content of the meth-acrylate ester in the ethylene-methyl acrylate copolymer is 25% by mass or more and 29% by mass or less,
a content of the flame retardant is 20 parts by mass or more and 40 parts by mass or less when a content of the resin component is set to 100 parts by mass, a content of the ethylene-propylene-diene terpolymer or the ethylene-acrylate rubber in the resin component is 20% by mass or more and 60% by mass or less,
a content of the ethylene-methyl acrylate copolymer in the resin component is 40% by mass to 80% by mass,
the flame retardant includes a bromine flame retardant and an antimony flame retardant, and
a mass ratio of the bromine flame retardant to the antimony flame retardant is 3/2 to 7/3.

2. The resin composition according to claim 1, wherein a content of the ethylene-propylene-diene terpolymer in the resin component is 20% by mass or more and 60% by mass or less.

3. The resin composition according to claim 1, further comprising
an additive, wherein
a content of the additive is 25 parts by mass or less when the content of the resin component is set to 100 parts by mass.

4. The resin composition according to claim 1, wherein a content of the ethylene-acrylate rubber in the resin component is 20% by mass or more and 60% by mass or less.

5. The resin composition according to claim 1, wherein the resin component consists of:
(a) the ethylene-(meth)acrylate ester copolymer, and
(b) the at least one of the ethylene-propylene-diene terpolymer or the ethylene-acrylate rubber.

6. A sheathed cable comprising:
a conductor; and
a sheathing layer sheathing the conductor and formed of the resin composition according to claim 1.

7. A wire harness comprising
the sheathed cable according to claim 6.

* * * * *